United States Patent [19]

Carson

[11] 4,200,787
[45] Apr. 29, 1980

[54] FIBER OPTIC ELEVATION SENSING APPARATUS

[75] Inventor: William M. Carson, Marina Del Rey, Calif.

[73] Assignee: CLS Industries, Inc., Los Angeles, Calif.

[21] Appl. No.: 910,197

[22] Filed: May 30, 1978

[51] Int. Cl.² .............................................. G01D 5/26
[52] U.S. Cl. .................................. 250/227; 350/96.24
[58] Field of Search ...................... 250/227; 350/96.24

[56] References Cited

U.S. PATENT DOCUMENTS

| | | | |
|---|---|---|---|
| 3,384,755 | 5/1968 | Williamson et al. | 250/227 |
| 3,542,451 | 6/1969 | Washburn | 250/227 X |
| 3,708,232 | 1/1973 | Walsh | 350/96.24 X |
| 3,906,220 | 9/1975 | Delingat | 250/227 |
| 4,013,342 | 3/1977 | Narodny | 250/227 X |

*Primary Examiner*—David C. Nelms
*Assistant Examiner*—Darwin R. Hostetter
*Attorney, Agent, or Firm*—Fulwider, Patton, Rieber, Lee & Utecht

[57] ABSTRACT

An omnidirectional fiber optic laser beam sensing apparatus for particular use in detecting the elevation of a light beam. A plurality of optical fibers are arranged to receive light from a plurality of separate elevation zones and to transmit the light to a lesser plurality of phototransducers located within a grounded enclosure. The fibers corresponding to each elevation zone are grouped into separate fiber bundles and oriented to direct the light to a common phototransducer, whereby each phototransducer senses light received within a separate elevation zone.

25 Claims, 11 Drawing Figures

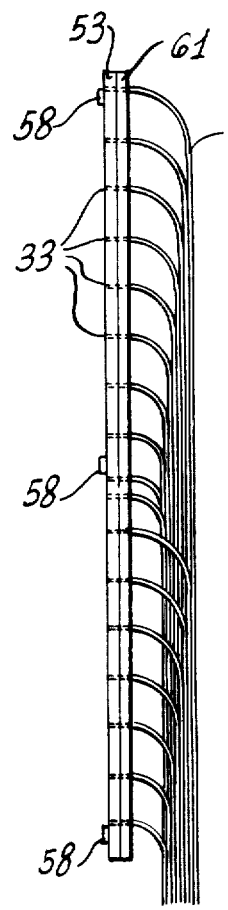
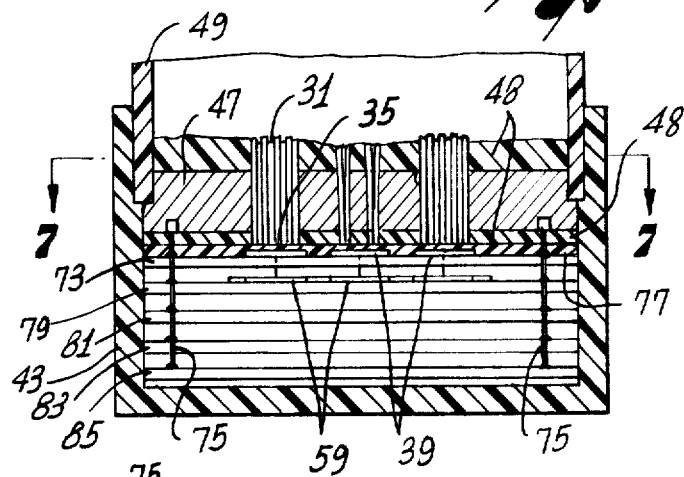
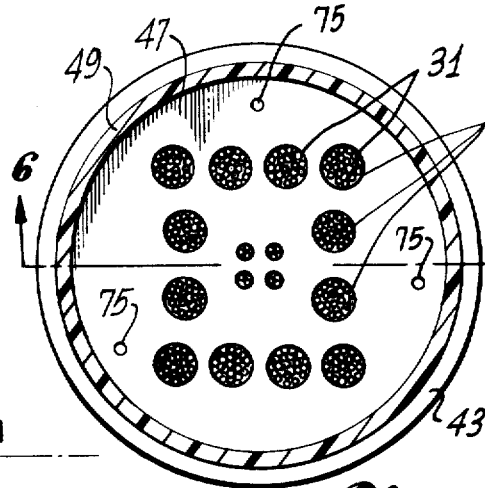
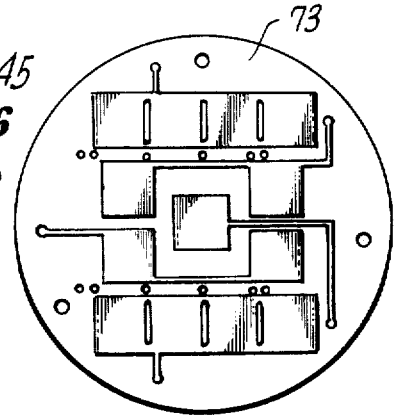
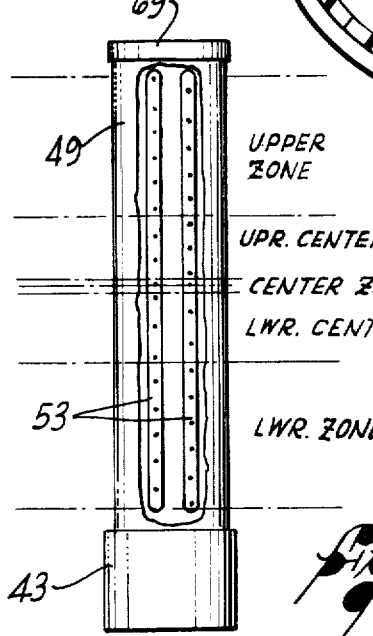
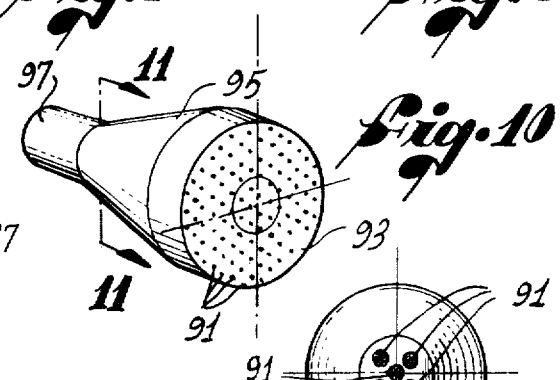
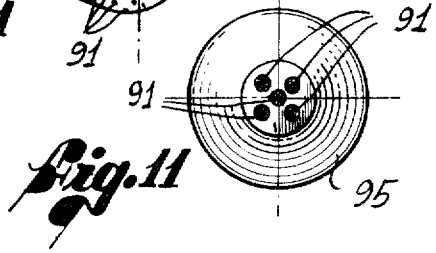

FIBER OPTIC ELEVATION SENSING APPARATUS

BACKGROUND OF THE INVENTION

This invention relates generally to apparatus for sensing light beams and, more particularly, to fiber optic sensing apparatus for detecting the location of a laser beam.

In recent years, with the development of relatively low cost lasers, control systems utilizing such lasers have come into increasing usage. These control systems have proven particularly beneficial in construction, agricultural and general surveying applications, where a precise alignment of various instruments and materials is frequently essential.

When such a laser control system is utilized outdoors under bright sunlight or at long ranges, the light beam is not ordinarily visible to the human eye, so special light sensors are utilized to detect the precise location of the beam. In the past, such a sensor typically included an array of phototransducers, in the form of phototransistors or silicon photocells, disposed in the region where the light beam was expected to be located. Such sensors have not proven entirely satisfactory, however, because the phototransducers are susceptible to sunlight and radio-frequency interference and because large arrays can be excessively expensive.

Laser beam control systems have been particularly useful in controlling the elevation of the cutting blades of earth moving machines such as trenchers and graders. Such a system typically includes a rotating laser beam transmitter, which is fixed in relation to the field on which work is to be done, and which produces a light beam that rotates in a plane having a predetermined angle relative to a horizontal axis. The plane of light is thus spaced a predetermined distance above the desired elevation of the cutting blade, wherever the blade is located in the field. A laser beam sensing apparatus is mounted on the earth moving machine and senses the elevation of the plane of light relative to the cutting blade. Appropriate signals for use in manually or automatically adjusting the elevation of the cutting blade are then produced.

Typical laser beam elevation sensing apparatus that have been available prior to the present invention include a vertically oriented post on which an array of phototransducers are arranged. The post is disposed so as to be periodically intersected by the rotating beam of light. If a phototransducer near the top of the post senses the periodic light impulses or "blips", it is determined that the cutting blade of the earth moving device is too low, and, conversely, if a phototransducer near the bottom of the post senses the light impulses, it is determined that the cutting blade is too high.

A drawback to such apparatus arises when the earth moving machine changes its direction relative to the transmitter. The phototransducers can become oriented in such fashion that they are directed away from the transmitter and thus are unable to detect the rotating light beam. To overcome this drawback, the prior apparatus required special controls operable whenever there was a failure to detect the rotating laser beam, for rotating the post to seek and locate the beam.

Another drawback to the aforedescribed laser beam sensing apparatus derives from exposure of the phototransducers to radio-frequency interference from such sources as high-tension lines, radar, and ignition systems. Still another drawback to the apparatus arises from the limited speed of the phototransducers, especially when they are fully illuminated by the rotating laser beam. This necessarily limits the range at which the apparatus is operable, because the duration of each of the periodic light impulses that are to be detected varies inversely with the distance from the transmitter. Accordingly, when relatively large areas are to be covered by the earth moving machine, the laser beam transmitter must be frequently repositioned and readjusted.

More recently, laser beam sensing apparatus including arrays of phototransducers arranged in four vertical rows at 90° spacing around the post have been developed. This provides a more omnidirectional sensor, whereby loss of detection of the rotating laser beam does not occur when the earth moving machine changes direction. However, the apparatus nevertheless operates at a substantially lower efficiency when the post is oriented such that the phototransducers receive the laser beam at oblique angles. Additionally, such apparatus are still subject to the aforementioned drawbacks of being susceptible to radio-frequency interference, and of having a limited range. Further, since many more phototransducers are utilized, the omnidirectional apparatus is substantially more expensive.

It will be appreciated from the foregoing that there is a definite need for improved apparatus for sensing the location of a light beam, which is substantially immune to radio-frequency interference, and which is operable at an improved range, while doing so with a minimum number of costly phototransducers. Additionally, there is a definite need for apparatus that can sense, wih a substantially uniform efficiency, the location of a light beam received from any direction. The present invention fulfills these needs.

SUMMARY OF THE INVENTION

This invention resides in an improved apparatus for sensing the location of a received beam of light. The apparatus includes a plurality of optical fibers, each having a receiving end and a terminal end, with the receiving ends of the fibers arranged in a predetermined pattern over a light reception area, and with the terminal ends arranged to direct the light that is received to a plurality of phototransducers for detection of the light beam.

In accordance with the invention, the light reception area is divided into a number of separate regions and the fibers for each such region are grouped together into separate fiber bundles, which, in turn, transmit received light to a separate phototransducer. By this technique, receipt of the light beam by any single fiber in a given region is detected by a single phototransducer, thereby permitting a relatively small phototransducer to detect the receipt of light over a much larger area.

The present invention is particularly useful in a system for controlling the elevation of the cutting blade of an earth moving machine. The apparatus can be used in combination with a rotating laser beam transmitter, which is fixed in relation to the ground, and which produces a plane of light having a predetermined selectable angle (possibly 0°) relative to a horizontal plane. The laser beam can be rotated at speeds as high as 1000 r.p.m. The apparatus of the invention, which is fixed in relationship to the cutting blade, operates to detect the relative elevation of the plane of light and, thus, produce an indication of the elevation of the cutting blade.

More particularly, the receiving ends of the optical fibers of the elevation sensing apparatus are arranged in a spaced relationship on a vertically oriented sensor head. Light that is received by the receiving ends is transmitted along the fibers to the corresponding transmitting ends, from which it is directed at the phototransducers. Fibers having receiving ends disposed at predetermined elevation zones of the sensor head are grouped into separate bundles and oriented with the terminal ends in each bundle directed at a common phototransducer. When light from the rotating laser beam is received by a particular fiber during each of its revolutions, the corresponding phototransducer will detect the light impulses and produce a corresponding signal.

In accordance with one aspect of the present invention, the sensor apparatus can be made omnidirectional by arranging the receiving ends of the optical fibers in such a manner as to detect the receipt of light from all horizontal directions. In this manner, the elevation of the rotating laser beams can be detected, regardless of the orientation of the earth moving relative to the transmitter. The optical fibers that have receiving ends disposed within each of a plurality of predetermined elevation zones are bundled together and oriented to direct any light that is received to a common phototransducer, whereby the elevation of the plane of light is detected regardless of the direction from which the light is received.

For each elevation zone, adjacent optical fibers are disposed with the axes of their receiving ends angled with respect to each other at approximately 30°, whereby at least one fiber will always be substantially aligned with the light beam at the moment it sweeps across the seensor head. The light impulses can therefore be detected with a substantially uniform efficiency. The central region of the sensor head has a greater density of optical fibers, to enable a more precise control of the cutting blade at that elevation.

In accordance with another aspect of the present invention, the phototransducers are located within a grounded enclosure, whereby interference from high-tension lines, radar, and other radio-frequency sources is substantially reduced. The fiber optic bundles are inserted into separate openings in a bulkhead of the enclosure and a separate phototransducer is disposed beneath each such opening. When light from the rotating laser beam is received by an optical fiber, it is transmitted along the fiber and directed to the corresponding phototransducer. Only a relatively small portion of the phototransducer is thereby illuminated, and the phototransducer has a relatively fast response time.

The sensor head, which holds the receiving ends of the optical fibers, includes a transparent plastic cylinder disposed on the earth moving machine in a substantially vertical orientation. The receiving ends of the optical fibers are held in a series of molded epoxy resin strips, which are fixed in a vertical orientation adjacent the inside surface of the cylinder, at spacings of approximately 30°. The fibers are suitably bundled together on the inside of the cylinder and the bundles are directed towards the enclosure bulkhead at the lower end of the cylinder, where a layer of epoxy adhesive holds the bundles rigidly in place.

The receiving end of each optical fiber is disposed substantially horizontally to receive the rotating laser beam most efficiently, and the terminal end of each fiber is disposed substantially vertically to project through one of the openings in the enclosure bulkhead. Because of this, an intermediate portion of the fiber experiences bending of approximately 90°. To provide support for this fiber bending, especially for the fibers disposed at the lower end of the cylinder, the epoxy resin strips are formed with backing layers of polyurethane foam.

By use of a centrifuge, a transparent epoxy resin coating is placed in a gap between each of the receiving ends of the optical fibers and the inside surface of the sensor head cylinder. This reduces light transmission losses that would otherwise occur because of an air interface. An opaque epoxy resin coating is then placed over the transparent coating to prevent the sidewalls of the optical fibers from receiving additional ambient light, which would interfere with detection of the periodic light impulses from the rotating laser beam. Additionally, a polyurethane foam is injected into the remaining space within the cylinder, to protect the optical fibers from being damaged by shock or vibration.

The terminal ends of the optical fibers in each fiber bundles are milled flat and a printed circuit board on which the phototransducers are mounted is oriented immediately adjacent the fiber ends. Light from all of the fibers in each bundle is thereby directed at a separate phototransducer. A transparent epoxy resin layer is placed between the terminal ends of the fibers and the phototransducers, again to reduce light transmission losses that would otherwise occur because of an air interface. Printed circuit boards carrying circuitry for amplifying the signals produced by the phototransducers and for suitably processing such amplified signals are disposed within the grounded enclosure, beneath the phototransducer circuit board.

Many other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

In the accompanying drawings:

FIG. 5 is an elevational view of one of the epoxy resin strips of the apparatus of FIG. 1, showing the receiving ends of a plurality of optical fibers being properly held in a substantially horizontal position;

FIG. 6 is a sectional view of the lower portion of the apparatus, taken substantially along the line 6—6 in FIG. 7, showing a plurality of fiber bundles and a plurality of silicon photodiodes oriented to receive light transmitted by the bundles, and mounted on a printed circuit board within the grounded housing;

FIG. 7 is a sectional view of the housing bulkhead, taken substantially along the line 7—7 in FIG. 6;

FIG. 8 is a plan view of the printed circuit board on which the silicon photocells are mounted;

FIG. 9 is an elevational view of the apparatus of FIG. 1, showing the separate elevation zones into which the apparatus is divided;

FIG. 10 is a perspective view of an alternative embodiment of the present invention, showing a plurality of optical fibers with their receiving ends arranged in a coplanar relationship; and FIG. 11 is a sectional view of the embodiment, taken substantially along the line 11—11 in FIG. 10.

DESCRIPTION OF THE PREFERRED EMBODIMENTS

Figure 1:
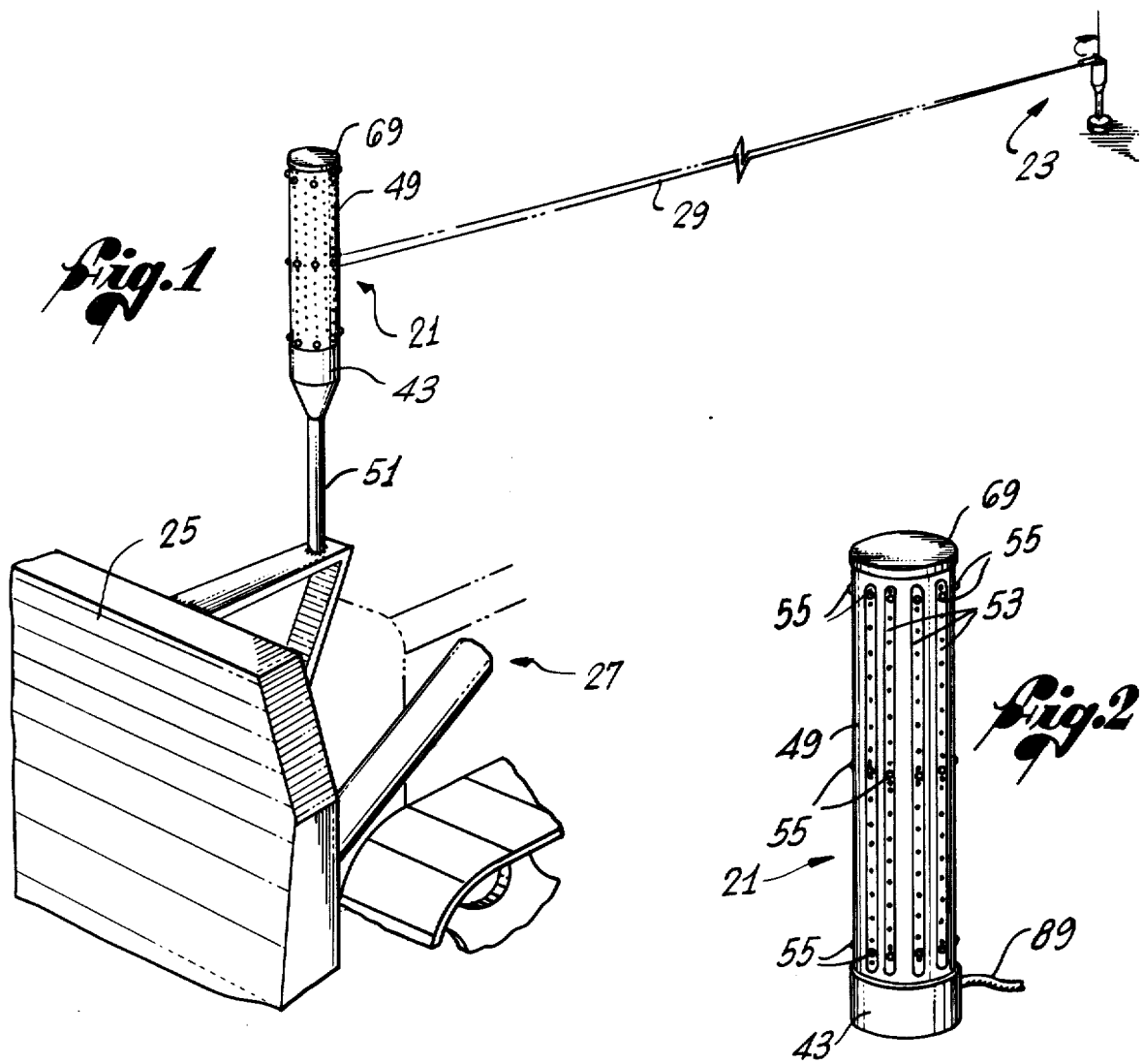
FIG. 1 is a simplified perspective view of a fiber optic laser sensing apparatus embodying the present invention, with the apparatus operatively mounted on the cutting blade of an earth moving machine and with a rotating laser beam transmitter being shown in the background.
Figure 2:
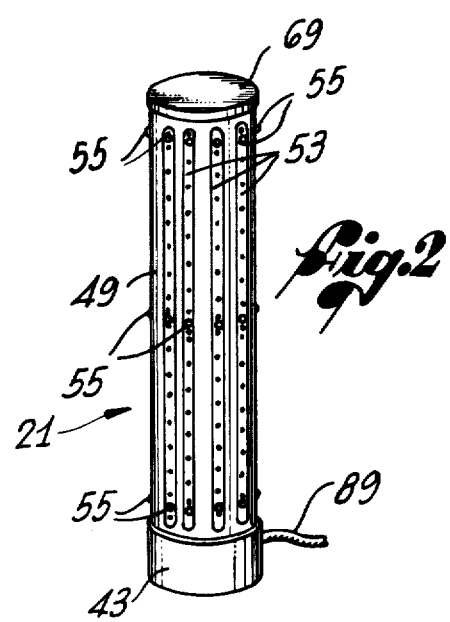
FIG. 2 is an enlarged perspective view of the apparatus of FIG. 1.

Referring now to the drawings, and particularly to FIGS. 1 through 9, there is shown a light beam sensing apparatus 21 constructed in accordance with a preferred embodiment of the present invention. The apparatus can be used in combination with a rotating laser beam transmitter 23 (FIG. 1) to precisely control the elevation of the cutting blade 25 of an earth moving machine 27.

The transmitter 23 is fixed in relationship to an area that is to be worked on by the earth moving machine 27, and it produces a generally horizontal laser beam 29 that is continuously rotated through 360°, at speeds of about 300 to 1000 r.p.m., thereby effectively creating a plane of light. The angle of the plane of light relative to a horizontal axis can be selectively controlled, whereby the distance of the plane above the desired elevation for all portions of the area being worked on can likewise be selectively controlled. A horizontal plane of light will result in a horizontal cut in in the earth, and a sloping plane will result is a corresponding sloping cut. One suitable laser beam transmitter that can be advantageously used with apparatus of the present invention is an AccuSweep 721 transmitter, manufactured by CLS Industries, Inc., of Los Angeles, Calif.

The sensor apparatus 21, which is mounted in a substantially vertical orientation on the earth moving machine 27, and which moves in synchronism with the cutting blade 25, is adapted to sense the elevation of the plane of light and, accordingly, produce appropriate signals that permit the elevation of the cutting blade to be precisely controlled. The sensor apparatus 21 includes a plurality of optical fibers 31, each having a receiving end 33 and a terminal end 35, for receiving light from a plurality of separate elevation zones 37 (FIG. 9) and transmitting the light to phototransducer means in the form of a plurality of silicon photocells 39, where the light is sensed.

In accordance with the invention, the optical fibers 31 that receive light from each of the elevation zones 37 are grouped together into separate fiber bundles 41, and each such bundle is oriented to direct light received by any of its fibers to a separate photocell 39. In this manner, if the rotating light beam 29 repetitively intersects the receiving end 33 of any fiber in a particular elevation zone, the periodic light impulses will be transmitted to the corresponding photocell, for detection.

It will be appreciated that each photocell 39, although relatively small in area, can sense light that is received over an elevation zone 37 of much larger area. Additionally, each fiber 31 directs light to only a small portion of its corresponding photocell, and the photocell has a particularly fast response time.

In accordance with another aspect of the present invention, the silicon photocells 39 are located within a grounded metallic enclosure or housing 43, whereby interference from high-tension lines, radar, ignition systems and other radio-frequency sources is reduced. Also located in the housing is electronic circuitry for amplifying and suitably processing the signals produced by the photocells. The fiber bundles 41 are inserted into the housing 43 through openings 45 formed in a bulkhead 47, and layers of epoxy adhesive 48 maintain them in proper alignment with the corresponding silicon cells 39.

The optical fibers 31, which can be formed of 0.56 inch diameter DuPont CROFAN, are housed in a transparent polycarbonate cylinder 49 approximately three inches in diameter and twelve inches in length. The cylinder is attached at its lower end to the metallic housing 43, and the housing is, in turn, attached to a mast 51, which projects upwardly from the cutting blade 25 of the earth moving machine 27.

The receiving ends 33 of the optical fibers 31 are disposed in a special pattern adjacent the interior surface of the cylinder 49 and oriented to receive light from substantially all horizontal directions. In this manner, the sensor apparatus 21 is operable to sense the elevation of the plane of light, regardless of the orientation of the earth moving machine 27 relative to the laser beam transmitter 23.

Figures 3, 4:
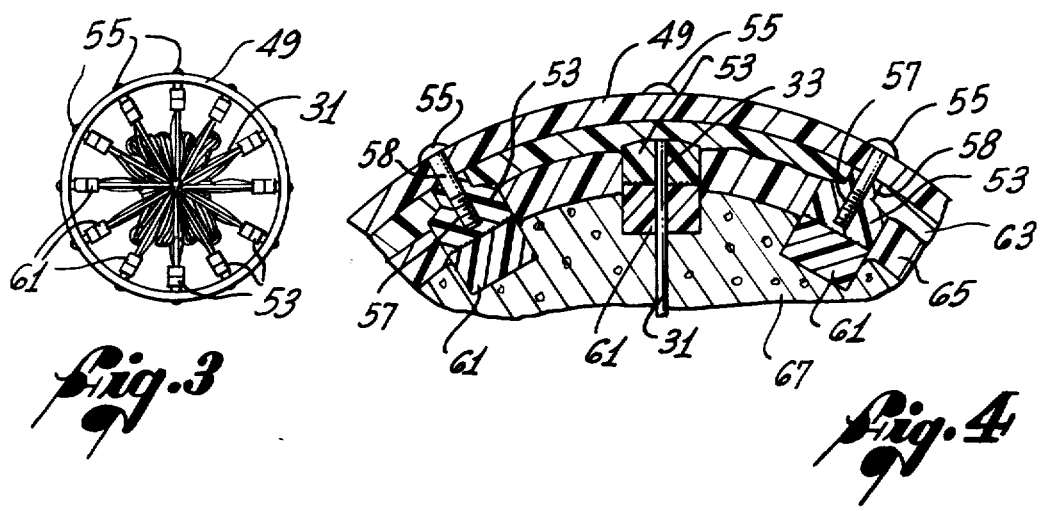
FIG. 3 is a plan view of the apparatus of FIG. 1, showing the interior of the sensor cylinder prior to the insertion of the layers of epoxy resin and polyurethane foam.
FIG. 4 is a fragmentary sectional view of the apparatus of FIG. 1, showing three epoxy resin strips properly positioned adjacent the interior surface of the sensor cylinder.

As best shown in FIGS. 4 and 5, the receiving ends 23 of the optical fibers 31 are held in position by a plurality of elongated epoxy resin strips 53, which are disposed in spaced relationship adjacent the interior surface of the cylinder 49, at spacings of approximately 30°. Herein, each such epoxy resin strip holds the receiving ends of seventeen optical fibers, at spacings of about 0.65 inches. The fiber ends on adjacent strips are arranged in a staggered relationship, whereby a more uniform distribution of fibers on the cylinder is achieved. Additionally, the density of fibers is greater at a central portion of each strip 53, to provide an even greater detection capability in that region.

The epoxy resin strips 53 are formed individually by pouring resin into a mold in which seventeen fibers have been previously fixed in a spaced parallel relationship. After the strip, with the fibers 31 in position, has cured, the tips of the receiving ends 33 of the optical fibers are ground flush with the outwardly facing surface of the strip, to prevent light from entering the fibers through their sidewalls.

The epoxy resin strips 53 are attached to the interior surface of the cylinder 49 by a plurality of screws 55, which engage corresponding threaded bores 57 formed in the strips. For reasons that will be explained subsequently, bosses 58 formed around the bores 57 operate to space the outwardly-facing surfaces of the strips 53 by approximately 0.030 to 0.040 inches from the inwardly facing surface of the cylinder 49. Additionally, the outwardly facing surfaces of the strips are beveled, so as to form a more uniform gap between the strips and the inwardly-facing surface of the cylinder.

As shown in FIG. 9, the cylinder 49 of the sensor apparatus 21 is divided into a number of contiguous elevation zones 37: an upper zone, an upper-center zone, a center zone, a lower-center zone, and a lower zone. The upper and lower elevation zones are each approximately four inches in length and each include approximately 66 optical fibers 31, the upper-center and lower-center zones are each approximately one and one half inches in length and each include approximately 30 fibers, and the center zone is approximately one half inch in length and includes 12 fibers. It will, of course, be appreciated that the relative sizes of the elevation zones has been found beneficial for the present embodiment only, and that the invention is not limited to these particular selections.

The optical fibers 31 for the upper elevation zone and the lower elevation zone are grouped into four fiber bundles 41 each, and each such bundle is inserted through a separate opening 45 in the housing bulkhead 47, which is located at the lower end of the cylinder 49. The light transmitted by each of these bundles is received by a separate silicon photocell 39, and the outputs of the cells for each zone are ganged together and amplified by a pre-amplifier circuit 59. Since the outputs of the photocells are combined, the identity of the fibers in the plurality of bundles for each zone is not critical.

In a similar fashion, the fibers for the upper-center and lower-center elevation zones are grouped into two bundles 41 each, and each such bundle is inserted through a separate opening 45 in the bulkhead 47. The optical fibers for the center elevation zone are grouped into four smaller fiber bundles and inserted into four closely-spaced openings in the bulkhead, where they are directed at a single photocell 39. Each bulkhead opening 45 has just sufficient size to permit insertion of the corresponding fiber bundle.

Assembly of the sensor apparatus 21, including the formation of the fiber bundles 41, is facilitated by handling the epoxy resin strips 53 in groups of six (i.e., two such groups for each sensor apparatus), before they are placed within the cylinder 49. By this technique, the fibers, which project outwardly from the inwardly-facing surfaces of the strips 53, are more readily accessible and thus can be grouped into the appropriate bundles more easily. For each grouping of six epoxy resin strips, there are produced two bundles for each of the upper and lower elevation zones, one bundle for each of the upper-center and lower-center zones, and two small bundles for the center elevation zone. The two groups of six epoxy resin strips each, with the optical fibers appropriately bundled, are then inserted into the cylinder 49 for attachment thereto and for insertion of the bundles 41 through the corresponding openings 45 in the bulkhead 47.

As best shown in FIG. 5, each optical fiber 31 must be bent by approximately 90° between its receiving end 33, which is disposed substantially horizontally, and its terminal end 35, which is inserted through one of the openings 45 in the housing bulkhead 47, and which is oriented substantially vertically. To provide support for each fiber in the region of maximum bending, the inwardly-facing side of each epoxy resin strip 53 is formed with a polyurethane foam layer 61. This distributes the lateral forces imposed on the fibers, and hence reduces the likelihood of breaking. Additionally, heat shrinkable sleeving (not shown) can be placed around the fibers for the lower elevation zone, because they are shorter and more likely to experience severe bending.

Using a centrifuge (not shown), a crystal clear catalyzed epoxy resin coating 63 (FIG. 4) is placed in the gap between the outwardly facing surface of each epoxy resin strip 53 and the inside surface of the cylinder 49. Degassing the resin and using the centrifuge in a vacuum insures that the resin coating will be devoid of interfering gas bubbles. This resin coating reduces light transmission losses that would otherwise occur because of the air interface. The beveled edges of the epoxy strips 53 facilitate the flow of the resin into the gap.

After the clear epoxy resin coating 63 has cured, and again using the centrifuge, an opaque black pigmented epoxy resin coating 65 is placed over the clear coating to prevent ambient light from reaching the interior of the cylinder 49 and thereby being received by the sidewalls of the optical fibers 31. Additionally, after the black epoxy resin coating has cured, a polyurethane foam 67 is injected into the remaining space within the cylinder, to reduce the possibility of damage to the optical fibers 31 from shock or vibration, and a metallic lid or cover 69 is attached to the top of the cylinder to seal the interior.

As shown in FIG. 6, after the terminal ends 35 of the optical fibers 31 have been inserted through the bulkhead openings 45 and held securely in place by the layers of epoxy adhesive 48, the fibers and epoxy adhesive are milled to form a flat layer having a uniform thickness of about 0.030 inches, immediately beneath the bulkhead 47. This insures that the terminal ends in each fiber bundle 41 are coplanar and oriented to emit light in a parallel fashion.

As best shown in FIGS. 6 through 8, the silicon photocells 39 are fixed to a p.c. board 73 that is precisely oriented beneath the terminal ends 35 of the fiber bundles 41 by means of three alignment posts 75, which are fixed to and project downwardly from the bulkhead 47. Each photocell is then automatically oriented immediately beneath the milled receiving ends of a separate fiber bundle, with a spacing of approximately 0.030 inches. In addition to properly orienting the printed circuit board, the posts 75 serve as electrical common or ground for both the bulkhead 47 and the photocells 39. The region between the bulkhead and the p.c. board 73 is potted with a crystal clear catalyzed epoxy resin 77, to reduce light transmission losses that would otherwise occur because of an air interface.

As shown in FIG. 6, a p.c. board 79 containing the conventional pre-amplifier circuits 59 is disposed immediately beneath the board 73 that carries the photocells 39. This pre-amplifier board is also properly oriented by means of the grounded alignment posts 75. A separate pre-amplifier circuit is included for each elevation zone 37, with each circuit receiving inputs from all of the photocells 39 for the corresponding zone. Separate signals corresponding to the total power received by the optical fibers 31 in each zone, are thus produced.

A grounded p.c. board 81, along with additional p.c. boards 83 and 85 carrying electrical circuitry for processing the signals produced by the pre-amplifiers 59, are disposed beneath the pre-amplifier board 79. The housing 43 is placed over all of the p.c. boards and attached to the cylinder 49 by any suitable means such as screws (not shown). The housing is grounded so that it combines with the grounded bulkhead 47 and grounded p.c. board 81 to form an enclosure for the silicon photocells 39, which effectively shields against interference from external radio-frequency noise sources. This shielding substantially improves the capability of the apparatus to sense the receipt of periodic light impulses from the rotating laser beam 29.

Since the light received from the laser beam transmitter 23 is in the form of periodic light impulses, the electrical circuitry located on p.c. boards 83 and 85 can readily distinguish the laser light from ambient sunlight, which has a relatively constant intensity. The circuitry detects the receipt of the light impulses in a conventional manner, and produces a multiplexed output signal for transmission over a cable 89 to additional circuitry in a control box (not shown) located at a remote location. This additional circuitry, in turn, demultiplexes the output signal and produces signals that are indicative of the elevation of the detected laser beam 29 and that can be utilized in either manual or automatic control systems to control the elevation of the cutting blade 25 of the earth moving machine 27. Circuitry for performing the aforementioned functions is well known and has been utilized in a number of sensor devices, including the AccuSensor 9921 laser sensing system, manufactured by CLS Industries, Inc., of Los Angeles, Calif.

Operation of a control system utilizing the sensor apparatus 21 described above, in grading a field to a predetermined angular grade will now be described. The rotating laser beam transmitter 23 is initially adjusted to produce a plane of light at an angle corresponding to the desired grade, whereby the light is everywhere disposed a predetermined distance D above the desired level of the field. The sensor apparatus 21 is then positioned on the earth moving machine 27, with its center elevation zone 37 disposed the same distance D above the cutting blade 25. In this manner, maintenance of the plane of light in the center elevation zone 25 as the machine moves across the field insures that the cutting blade will operate to grade the field to the desired level.

The beamwidth of the laser beam 29 produced by the transmitter 23 is preferably one half inch to one inch in diameter at a range of 1000 feet. Because of the close vertical spacing of the receiving ends 33 of the optical fibers 31, and because of a staggered relationship between the receiving ends on adjacent epoxy resin strips 53, the laser beam 29 will always impinge on at least one fiber as it sweeps across the sensor apparatus 21 on each revolution. Additionally, because adjacent strips 53 are disposed just 30° apart from each other, the laser beam will impinge on fibers in more than one strip, although, of course, the beam will strike some of the fibers at oblique angles. This insures that each revolution of the transmitter 23 will result in light impulses being transmitted along a number of optical fibers 31 to at least one photocell 39 for a particular elevation zone 37.

The electrical circuitry then operates in a conventional manner to detect the receipt of light impulses by any of the photocells 39 for each elevation zone 37 and, accordingly, produces appropriate signals indicative of the elevation of those light impulses. These signals are then utilized in manual or automatic control systems to appropriately control the elevation of the cutting blade.

In a manual control system, the circuitry can produce signals that drive various indicator lamps and that create various distinctive sounds. One suitable arrangement includes a separate lamp for each of the five elevation zones 37, and separate sounds for the two upper zones (e.g. dot), the center zone (e.g. dot-dot), and the two lower zones (e.g. dash). It has been found that this arrangement is highly effective in assisting an operator in maintaining the plane of light in the center elevation zone of the sensor apparatus 21, whereby the elevation of the cutting blade 25 can be properly controlled.

In an automatic control system, the circuitry can produce signals to actuate a double hydraulic valve or solenoid (not shown) that is operatively connected to the cutting blade 25. It has been found, for example, that actuating the solenoid in a continuous fashion when the plane of light intersects the upper or lower elevation zones, and in a pulsing fashion when the plane of light intersects the upper-center or lower-center elevation zones, is highly effective in maintaining elevation of the cutting blade at the desired center elevation. The duty cycle or frequency of the pulsing can be suitably selected according to the response characteristics of the hydraulic system.

FIGS. 10 and 11 illustrate an alternative embodiment of apparatus of the present invention. The embodiment includes a plurality of optical fibers 91 having receiving ends arranged in a coplanar pattern and adapted to receive light from substantially the same direction. This embodiment can be utilized advantageously in combination with a fixed laser beam transmitter, to detect alignment of the beam with a particular object. In particular, this embodiment can be of particular use in pipe laying applications, where a precise alignment of pipe sections is frequently essential.

The receiving ends of the optical fibers 91 are disposed on a front surface or face 93 of a frusto-conical body 95. The fiber ends are spaced sufficiently close to each other to insure that the laser beam will impinge on at least one fiber. The face can be divided into a plurality of zones or regions, such as, for example, four quadrants and a central region. The fibers are grouped into separate bundles for each such region and inserted through separate openings in a grounded metallic enclosure 97 located at the rear of the body, where they direct any light that is received to separate silicon cells.

It will be appreciated that each silicon photocell, although relatively small in area, can sense light that is received at any point over a much larger region. Additionally, since the photocells are located within a grounded enclosure, they are much less susceptible to radio-frequency interference.

Electrical circuitry amplifies the signals produced by the photocells and detects the region in which the laser beam is received. If the apparatus is to be utilized in an environment where substantial ambient light is present, the transmitter can be made to produce a pulsed laser beam. The circuitry can then utilize the periodic nature of the light to distinguish it from the ambient light, and thereby detect the receipt of the beam.

From the foregoing description, it should be apparent that the present invention is an effective apparatus for sensing the location of a beam of light, which is substantially immune to radio-frequency interference, and which utilizes a small number of phototransducers to sense light received over an area of much larger relative size.

While the invention has been illustrated and described with reference to its presently preferred embodiments, it will be understood by one of ordinary skill in the art that various modifications can be made without departing from the spirit and scope of the invention. Accordingly, it is not intended that the invention be limited, other than by the appended claims.

I claim:

1. Apparatus for sensing the elevation of a light beam transmitted from a remote location, comprising:
    a plurality of optical fibers, each of said fibers being adapted to receive light at a receiving end and to transmit the light to a terminal end, from which it is then emitted, said optical fibers being divided into a plurality of fiber groups;
    means for arranging the receiving ends of the optical fibers in each of said fiber groups in a prescribed pattern to receive light from a separate, predetermined elevation zone and from substantially all horizontal directions within each zone;

phototransducer means having a plurality of photo-sensitive surfaces; and means for orienting the terminal ends of the optical fibers in each of said fiber groups to direct light emitted therefrom toward a separate one of said photo-sensitive surfaces, whereby the presence of the light beam in any one of said predetermined elevation zones is sensed by the corresponding one of said photo-sensitive surfaces and the elevation of the light beam can be determined regardless of the relative direction from which it is transmitted.

2. Apparatus as defined in claim 1, wherein:
said means for arranging the receiving ends includes a plurality of vertically-oriented, elongated strips of molded epoxy resin, arranged in a substantially uniform, spaced parallel relationship, said fibers being embedded in said strips.

3. Apparatus as defined in claim 1, wherein:
said phototransducer means is disposed within a grounded enclosure to reduce interference from extraneous sources.

4. Apparatus for sensing the elevation of a light beam, comprising:
a plurality of optical fibers, each of said fibers being adapted to receive light at a receiving end and to transmit the light to a terminal end, from which it is then emitted;

a plurality of elongated strips of molded epoxy resin disposed in spaced parallel relationship and adapted to hold said optical fibers with their receiving ends arranged in a prescribed pattern, wherein light can be received by the fibers from a plurality of predetermined elevation zones and from substantially all horizontal directions within each zone;

a plurality of phototransducers; and means for orienting the terminal end of each of said optical fibers to direct light emitted therefrom toward a predetermined one of said phototransducers corresponding to a prescribed elevation zone, whereby the receipt of the light beam from substantially any direction within one of said predetermined elevation zones is sensed by a corresponding phototransducer.

5. Apparatus as defined in claim 4, wherein:
said optical fibers are divided into a plurality of groups;
the receiving ends of the optical fibers in each of said groups are all adapted to receive light from the same elevation zone; and
said orienting means orients the terminal ends of the fibers in each of said groups toward a separate phototransducer.

6. Apparatus as defined in claim 5, wherein:
said plurality of phototransducers are located within a grounded enclosure, to reduce interference from extraneous sources; and
each of said groups of optical fibers is arranged in a fiber bundle and inserted through a separate opening in a bulkhead of said enclosure.

7. Apparatus as defined in claim 6, wherein:
said plurality of phototransducers are mounted on a printed circuit board disposed immediately adjacent said enclosure bulkhead.

8. Apparatus as defined in claim 6, wherein:
said fiber bundles are fixed in relationship to said enclosure bulkhead by a layer of epoxy adhesive.

9. Apparatus as defined in claim 6, wherein:
a layer of transparent epoxy resin is disposed between the terminal ends of the optical fibers in each of said fiber bundles and the corresponding phototransducer, thereby reducing light transmission losses.

10. Apparatus as defined in claim 5, wherein:
each of said elongated strips of epoxy resin is formed with a compressible foam layer adjacent its surface opposite the receiving ends of said optical fibers, thereby distributing any lateral forces imparted by said elongated strip against the sidewalls of said optical fibers and reducing the likelihood of breaking said optical fibers during manufacture of the apparatus.

11. Apparatus as defined in claim 4, further including:
means for preventing light from being received by the sidewalls of said optical fibers.

12. Apparatus for sensing the elevation of a beam of light, comprising:
a plurality of optical fibers, each of said fibers adapted to receive light at a receiving end and to transmit the light to a terminal end, from which it is then emitted;

means for arranging the receiving ends of said optical fibers in a prescribed pattern to receive light from a plurality of separate elevation zones and from substantially all horizontal directions within each zone;

a plurality of phototransducers, each for sensing light received within a particular one of said elevation zones; and means for dividing said optical fibers into a plurality of groups and orienting the terminal ends of the optical fibers in each group to direct light emitted therefrom toward a predetermined one of said phototransducers, whereby receipt of the light beam at any one of said elevation zones is sensed by a corresponding one of said phototransducers.

13. Apparatus as defined in claim 12, further including:
a transparent cylinder disposed in a substantially vertical orientation, said cylinder having interior surface,
said arranging means including a plurality of elongated stips of molded epoxy resin disposed in a spaced parallel relationship adjacent the interior surface of said cylinder, said strips being adapted to hold said optical fibers and maintain the receiving ends of said optical fibers in said prescribed pattern.

14. Apparatus as defined in claim 13, wherein:
the receiving ends of said optical fibers are spaced from the interior surface of said cylinder; and
said apparatus further includes a layer of transparent epoxy resin disposed in the space between the receiving ends of said optical fibers and the interior surface of said cylinder, thereby reducing light transmission losses.

15. Apparatus as defined in claim 14, further including:
means for preventing light from being received by the sidewalls of said optical fibers.

16. Apparatus as defined in claim 14, further including:
a compressible filler material disposed within the interior of said cylinder, to reduce the likelihood of damage to said optical fibers due to shock or vibration.

17. Apparatus as defined in claim 13, wherein:
the receiving end of each of said optical fibers is substantially flush with the surface of the corresponding elongated strip that is adjacent the interior surface of said cylinder.

18. Apparatus for sensing the elevation of a beam of light rotating in a generally horizontal plane, said apparatus comprising:
a transparent cylinder disposed in a substantially vertical orientation, said cylinder having an interior surface;
a plurality of optical fibers, each of said fibers adapted to receive light at a receiving end and to transmit the light to a terminal end, from which it is then emitted;
a plurality of elongated strips of molded epoxy resin for holding said optical fibers and for arranging the receiving ends of said fibers in a prescribed pattern to receive light from a plurality of separate elevation zones and from substantially all horizontal directions within each zone, said elongated strips being disposed in spaced parallel relationship adjacent the interior surface of said cylinder, the receiving end of each of said fibers being spaced from said interior surface and being substantially flush with a surface of the corresponding elongated strip;
a layer of transparent epoxy resin disposed between the receiving ends of said optical fibers and the interior surface of said cylinder, to reduce light transmission losses;
a plurality of phototransducers, each for sensing light received within a particular one of said elevation zones;
a grounded enclosure for housing said plurality of phototransducers, whereby interference from extraneous radio-frequency sources is reduced;
means for arranging said optical fibers in a plurality of fiber bundles, each of said bundles being inserted through a separate opening in a bulkhead of said enclosure and including fibers adapted to receive light from a separate elevation zone;
means for preventing light from being received by the sidewalls of said optical fibers; and
means for orienting the terminal ends of the optical fibers in each of said fiber bundles to direct light emitted therefrom toward a separate one of said phototransducers, whereby the receipt of the light beam within any one of said elevation zones is sensed by a corresponding one of said phototransducers.

19. For use in combination with a remotely located, rotating laser beam transmitter of a type that produces a plane of light having a prescribed angle relative to a horizontal axis, apparatus for sensing the relative elevation of the plane of light, said apparatus comprising:
a plurality of optical fibers, each of said fibers adapted to receive light at a receiving end and to transmit the light to a terminal end, from which it is then emitted;
means for arranging the receiving ends of said optical fibers in a prescribed pattern, to receive light from a plurality of separate elevation zones and from substantially all horizontal directions within each zone;
a plurality of phototransducers, each for sensing light received within a particular one of said elevation zones; and
means for dividing said optical fibers into a plurality of groups and orienting the terminal ends of the optical fibers in each group to direct light emitted therefrom toward a predetermined one of said phototransducers, whereby receipt of the plane of light at any one of said elevation zones is sensed by a corresponding one of said phototransducers and the elevation zone of the plane of light is determined regardless of the direction from which it is transmitted.

20. Apparatus as defined in claim 19, wherein:
said plurality of phototransducers are located within a grounded enclosure, to reduce interference from extraneous sources; and
each of said groups of optical fibers is arranged in a fiber bundle and inserted through a separate opening in a bulkhead of said enclosure.

21. Apparatus as defined in claim 20, wherein a layer of transparent epoxy resin is disposed between the terminal ends of the optical fibers in each of said fiber bundles and the corresponding phototransducer, thereby reducing light transmission losses.

22. Apparatus as defined in claim 19, further including:
a transparent cylinder disposed in a substantially vertical orientation, said cylinder having interior surface said arranging means including a plurality of elongated strips of molded epoxy resin disposed in a spaced parallel relationship adjacent the interior surface of said cylinder, said strips being adapted to hold said optical fibers and maintain the receiving ends of said optical fibers in said prescribed pattern.

23. Apparatus as defined in claim 22, wherein each of said elongated strips of epoxy resin is formed with a compressible foam layer adjacent its surface opposite the receiving ends of said optical fibers, thereby distributing any lateral forces imparted by the strip against the sidewalls of its associated fibers and reducing the likelihood of breaking the optical fibers during manufacture of the apparatus.

24. Apparatus as defined in claim 22, wherein said plurality of elongated strips are substantially vertically oriented and are disposed in a substantially uniformly spaced relationship adjacent the interior surface of said cylinder.

25. Apparatus as defined in claim 13, wherein said plurality of elongated strips are substantially vertically oriented and are disposed in a substantially uniformly spaced relationship adjacent the interior surface of said cylinder.

* * * * *